United States Patent
Vaders

(10) Patent No.: US 6,579,483 B1
(45) Date of Patent: *Jun. 17, 2003

(54) METHOD OF MAKING A CONSOLIDATED CELLULOSIC ARTICLE HAVING PROTRUSIONS AND INDENTATIONS

(75) Inventor: Dennis H. Vaders, Elkin, NC (US)

(73) Assignee: Masonite Corporation, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/574,796

(22) Filed: May 19, 2000

(51) Int. Cl.⁷ .............. B27J 7/00; B29B 11/12; B29C 59/02
(52) U.S. Cl. .............. 264/126; 264/109; 264/123; 264/125; 264/257; 264/258; 264/293; 264/319; 264/330; 264/331.11
(58) Field of Search .............. 264/109, 320, 264/322, 324, 293, 505, 510; 144/358, 359, 361, 380, 368

(56) References Cited

U.S. PATENT DOCUMENTS

| | | | |
|---|---|---|---|
| 2,402,966 A | * | 7/1946 | Linzell .............. 162/117 |
| 2,542,025 A | | 2/1951 | Goss |
| 3,449,482 A | | 6/1969 | Mitchell et al. |
| 3,478,141 A | | 11/1969 | Dempsey et al. |
| 3,661,688 A | | 5/1972 | Wheeler |
| 3,809,736 A | | 5/1974 | Munk |
| 3,825,642 A | | 7/1974 | Kies |
| 3,839,514 A | | 10/1974 | Nauta |
| 3,917,785 A | | 11/1975 | Kalwaites |
| 4,061,813 A | | 12/1977 | Geimer et al. |
| 4,078,030 A | | 3/1978 | Munk et al. |
| 4,131,664 A | | 12/1978 | Flowers et al. |
| 4,142,007 A | | 2/1979 | Lampe et al. |
| 4,213,928 A | | 7/1980 | Casselbrant |
| 4,263,093 A | | 4/1981 | Shenk |
| 4,267,137 A | | 5/1981 | Smith |
| 4,305,989 A | | 12/1981 | Luck et al. |
| 4,702,870 A | | 10/1987 | Setterholm et al. |
| 4,913,639 A | * | 4/1990 | Wheeler .............. 264/263 |
| 5,198,236 A | | 3/1993 | Gunderson et al. |
| 5,306,539 A | | 4/1994 | Clarke et al. |
| 5,344,484 A | | 9/1994 | Walsh |
| 5,352,396 A | | 10/1994 | Zaragueta |
| 5,367,040 A | | 11/1994 | Teodorczyk |
| 5,425,976 A | | 6/1995 | Clarke et al. |
| 5,470,631 A | | 11/1995 | Lindquist |
| 5,489,460 A | | 2/1996 | Clarke et al. |
| 5,647,934 A | | 7/1997 | Vaders et al. |
| 5,756,599 A | | 5/1998 | Teodorczyk |
| 5,847,058 A | | 12/1998 | Teodorczyk |
| 6,203,738 B1 | * | 3/2001 | Vaders .............. 264/156 |

* cited by examiner

Primary Examiner—Stephen J. Lechert, Jr.
(74) Attorney, Agent, or Firm—Liniak, Berenato & White, LLC

(57) ABSTRACT

A consolidated cellulosic article of increased thickness and target face density, as well as an apparatus and method of manufacturing same, are disclosed. The apparatus includes first and second dies adapted to move toward on e another with a mat of cellulosic material and a binding agent therebetween. When the dies move together, the mat is compressed under pressure and heat with forms on one of the dies forming indentations in the mat. Compression zones of increased density form between the indentations and a first face of the mat. By spacing the forms appropriately, the compression zones overlap, and the face of the resulting consolidated board is provided with substantially uniform density. Since the entire board is not compressed to the same degree, its overall thickness is enchanced while the density of the first face of the mat is increased, and relatively little material is used.

8 Claims, 3 Drawing Sheets

METHOD OF MAKING A CONSOLIDATED CELLULOSIC ARTICLE HAVING PROTRUSIONS AND INDENTATIONS

BACKGROUND OF THE INVENTION

1. Field of the Invention

The present invention generally relates to wood products and, more particularly, relates to consolidated cellulosic panels or boards, and apparatus and methods for manufacturing same.

2. Description of Related Technology

During the manufacture of consolidated cellulosic articles, including fiberboard, paperboard, particleboard and the like, wood furnish such as chips, shavings, sawdust, or specially ground fibers, are compressed with a binding agent or resin under heat and pressure. Such boards can be used in a variety of applications including exterior house siding, interior and exterior door facing panels or doorskins, underlayments, garage or workshop paneling pegboard, etc.

The consolidated boards are typically manufactured to a desired face density to, among other things, ensure structural integrity, as well as desirable surface texture, appearance, and paint hold-out characteristics. Examples of consolidated boards and methods of manufacturing same are provided in U.S. Pat. Nos. 3,449,482; 3,661,688; 4,142,007; 4,702,870; and 5,198,236. Such boards must also avoid warping while maintaining such characteristics.

Using the aforementioned door facing panel application as an example, when such door facings are manufactured and shipped, they are often stacked on top of each other. Since there are molded indentations on the top surface of the facing and corresponding protrusions on the bottom surface of the facing, the facings nest together when stacked, with each protrusion registering with an indentation therebelow. The contact point for each top facing upon a corresponding bottom facing occurs between the molded indentations and protrusions. The remaining, unmolded, flat portions of the facings do not contact one another. Such unsupported areas therefore can tend to droop or warp.

For example, if the facings are 0.125' thick, the space between the flat, unmolded areas in the stacked facings may be 0.040' thick. If unsupported, such a single facing resting upon a perfectly supported bottom facing could droop 0.040'. However, such facings are typically stacked in groups of 150 facings or more. If each facing is left unsupported, the second from the bottom facing may droop only 0.040', but the third facing would droop twice that amount, the fourth would droop three times that amount, and so on. For a stack of 150 facings, the top facing may therefore droop close to six inches in the given example.

If the facings could be made to rest with the contact point between facings being the flat unmolded areas then each facing would be fully supported by the facing therebelow and no droop would occur. One way to accomplish this would be to increase the caliper of the flat unmolded areas by a thickness equal to the unsupported space between facings, 0.040' in the above example. Conventional manufacturing techniques cannot increase the caliper in such a manner without a corresponding decrease in density throughout the resulting board. Such decreases in density result in unacceptable decreases in the paint hold-out characteristic of the board, i.e., the board will absorb paint to an unacceptably high degree, potentially rendering the board unpaintable.

Alternatively, the caliper of the molded indentations and protrusions could be decreased accordingly to allow the flat unmolded areas to fully nest. Such decreases in caliper, however, result in corresponding increases in density. Conventional manufacturing techniques, if used to decrease the caliper to such a degree, would increase the density to a point at which the facings might blister, or otherwise fail.

SUMMARY OF THE INVENTION

According to the invention, a method for producing a consolidated cellulosic board includes the steps of providing a first die, providing a second die opposed to the first die, with the second die having a plurality of spaced forms extending toward the first die, positioning a mat of cellulosic material and a binder resin between the first and second dies, with the mat having a first face adjacent to the first die and a second face adjacent to the second die, and compressing the mat between the first and second dies, the first face being compressed to a substantially uniform density, the second face being compressed to a density lower than the density of the first face.

Other aspects of the invention will become more apparent from the following detailed description when taken in conjunction with the accompanying drawings and the appended claims.

Figure 1:
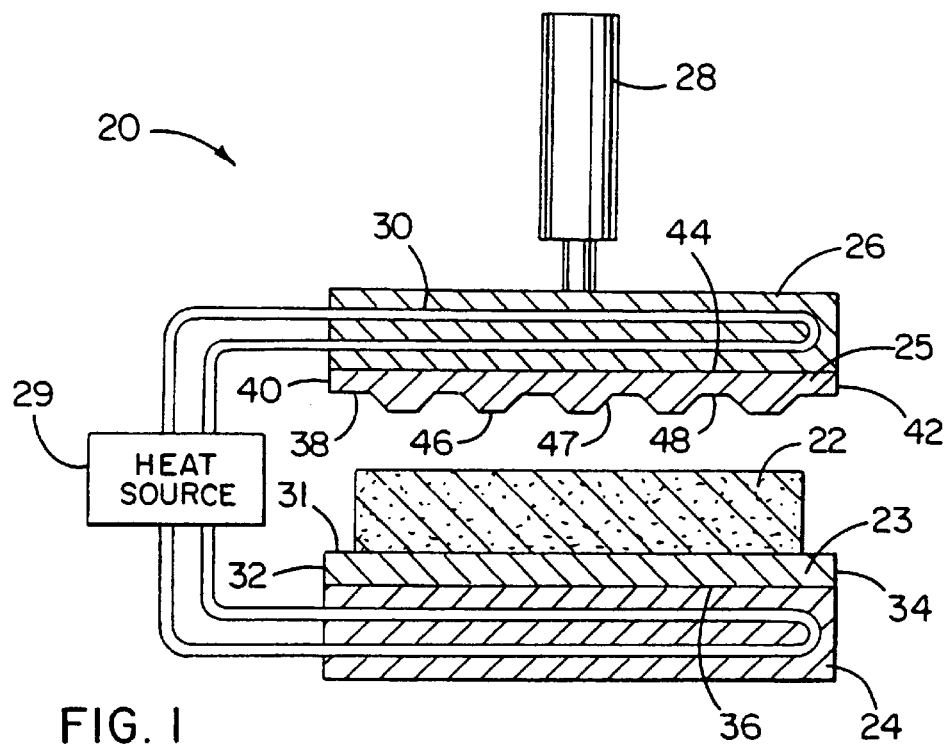
FIG. 1 is a partial cross-sectional view of first and second platens and dies constructed in accordance with the teachings of the invention with an uncompressed mat of cellulosic material therebetween.

While the invention is susceptible to various modifications and alternative constructions, certain illustrative embodiments thereof have been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention as defined by the appended claims.

DETAILED DESCRIPTION OF THE PREFERRED EMBODIMENTS

Referring now to the drawings, and with specific reference to FIG. 1, an apparatus for forming consolidated cellulosic articles according to the present invention is generally depicted by reference numeral 20. A mat 22 of uncompressed cellulosic material is shown disposed between a first die 23 mounted to a first platen 24, and a second die 25 mounted to a second platen 26. The mat 22 may be comprised of any number of cellulosic materials and binding agents to result in, when compressed under heat and pressure, a consolidated cellulosic article 51. The consolidated cellulosic article 51 may be used as, for example, siding, door facing panels, pegboard, paperboard, fiberboard, particleboard, and the like. The cellulosic materials within the mat 22 may include, but not be limited to, waste materials from lumber mill operations such as sawdust and wood chips, or may be provided in the form of specially ground fibers of a specific size or range of sizes. Thus, where fibers are referred to herein, it is understood that other materials could be substituted. The binding agent may be in the form of various adhesives or resins including phenolic or isocyanic resins. Various materials and methods of manufacturing consolidated cellulosic materials are described in U.S. Pat. Nos. 5,306,539; 5,344,484; 5,367,040; 5,425,976; 5,470,631; 5,489,460; 5,647,934; 5,756,599; and 5,847,058, the disclosures of which are hereby incorporated herein by reference.

Figure 2:
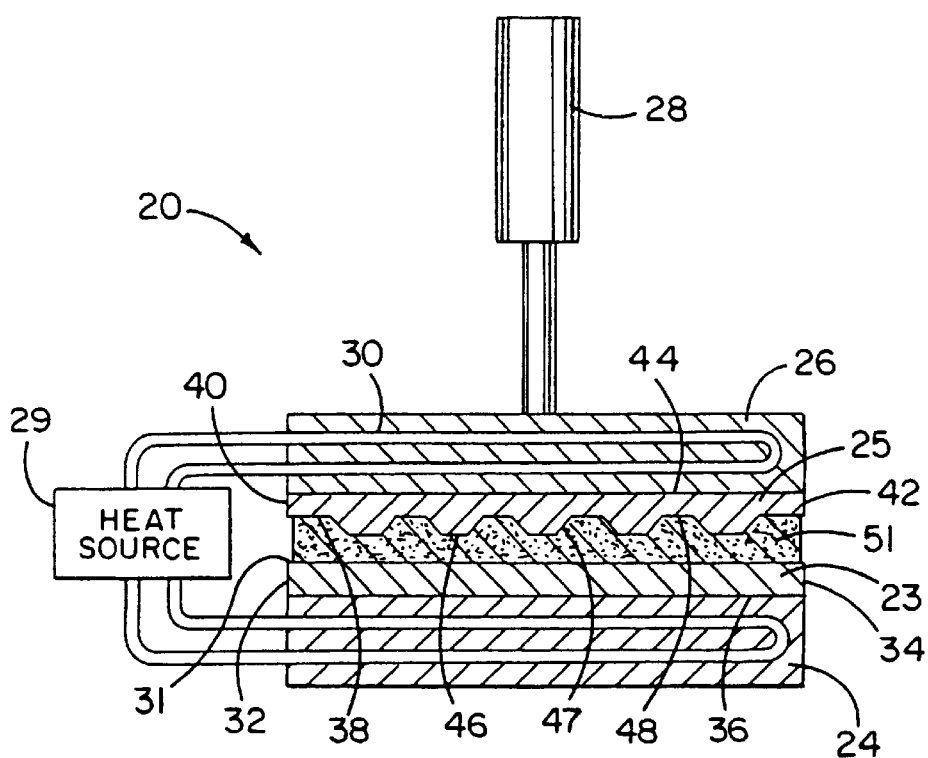
FIG. 2 is a partial cross-sectional view of the first and second platens and dies of FIG. 1 and the mat after compression.

Referring now to FIGS. 1 and 2, the first and second dies 23 and 25 are preferably manufactured from a suitably hard material such as steel or aluminum, and are mounted to the platens 24, 26, respectively, for relative movement toward each other. In the depicted embodiment, the mechanism for moving the first and second platens 24 and 26 toward one another is provided in the form of a cylinder 28 attached to the second platen 26, which is preferably hydraulic, but which can be provided in other forms, including pneumatic, as well as various forms of linear actuators. In the depicted embodiment, the first platen 24 is fixed, but a similar cylinder or cylinders may be attached to the second platen 24 as well. Each cylinder 28 may be sized to produce a range of pressure outputs, preferably in a range of about 3,000 psi to about 5,000 psi. The pressure exerted on the mat 22 is preferably in a range of about 400 psi to about 1000 psi.

A heat generation mechanism 29 is preferably provided such that the mat 22 is compressed under elevated temperatures as well. The heat generation mechanism 29 can take many forms including a source of heated oil or steam circulated through conduits 30 in the first and second platens 24, 26 and first and second dies 23, 25. The achieved temperature is typically in a range of about 300° F. to about 500° F. (about 149° C. to about 260° C.), depending on the curing temperature required by the particular binding agent or resin being used.

Figure 4:
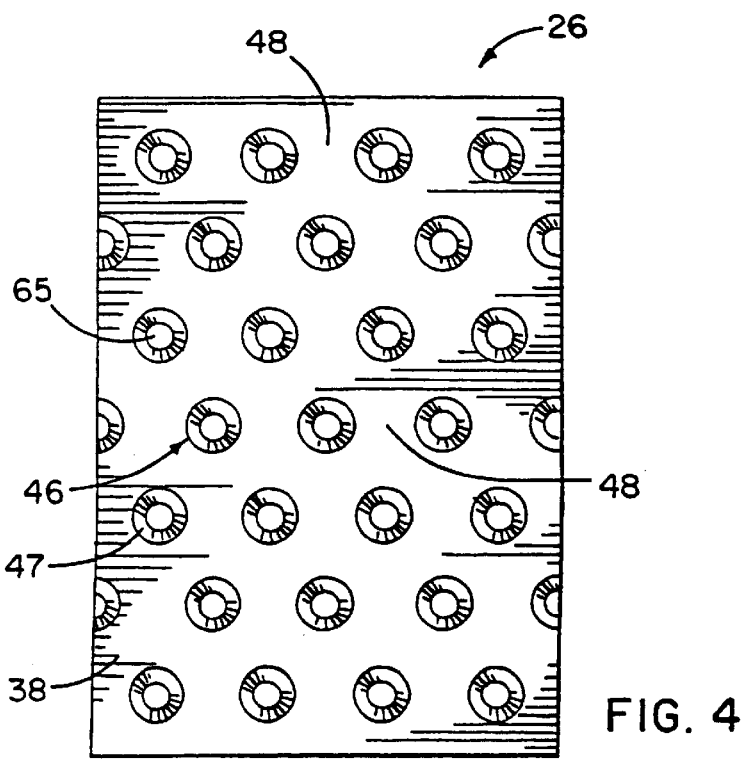
FIG. 4 is a plan view of the second die of FIG. 1.

The first die 23 includes a substantially flat top 31, sides 32 and 34, as well as a base 36. The second die 25 includes a bottom 38, sides 40 and 42, and a top 44. With reference now to FIG. 4, it will be noted that the second die 25 preferably includes a plurality of forms 46 extending from the bottom 38. In the depicted embodiment, the forms 46 are bulbous or frusto-conical, having angled, arcuate, or canted sides 47. Such shapes facilitate release of the consolidated article 51 from the second die 25. The angled sides 47 may be at a range of degrees, preferably from about 5° to about 45° from vertical.

Figure 3:
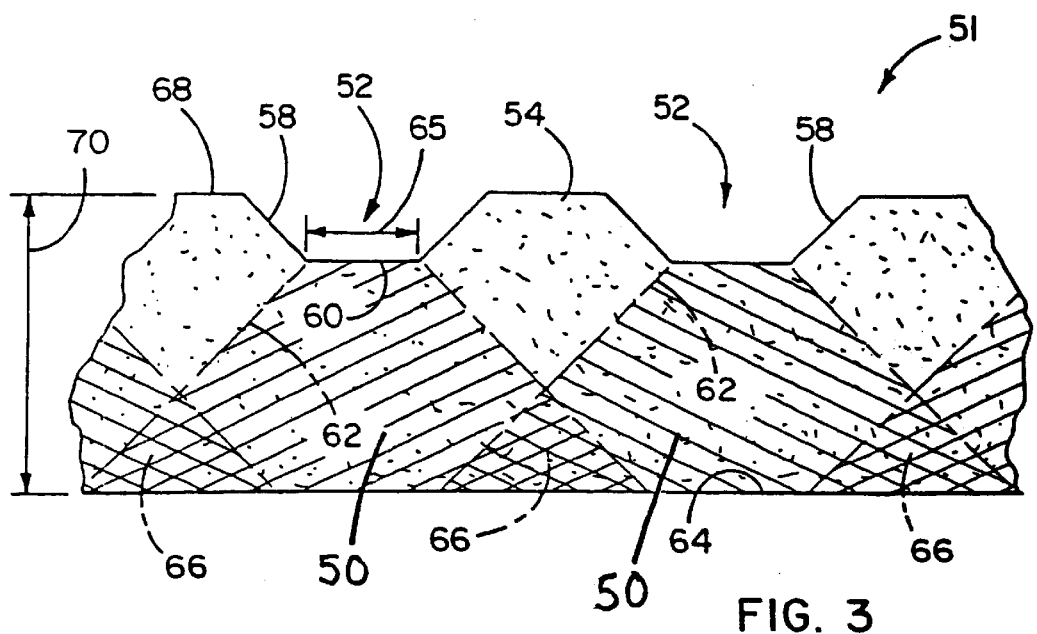
FIG. 3 is a fragmentary cross-sectional view of a consolidated board of cellulosic material manufactured according to the teachings of the invention.

It is preferable that the forms 46 are uniformly spaced apart by a plurality of voids 48 to allow for suitable overlap of compression zones 50, shown in FIGS. 2 and 3, and described in further detail herein. As shown in FIG. 3, after compression, the mat 22 is transformed into the compressed board 51, which includes a plurality of indentations 52 formed by the plurality of forms 46. The plurality of indentations 52 are interspersed by a plurality of protrusions 54. Each indentation 52 preferably includes angled side walls 58 formed by the tapered sides 47 of the forms 46, and thus have matching angles thereto. The forms 46 are selectively positioned and sized to ensure overlap of the compression zones depending on the desired thickness of the resulting board 51.

One of the compression zones 50 is created below each indentation 52 due to the tendency of an applied force to spread out while being transferred through a solid, a phenomenon not unlike that found in soil mechanics. Each compression zone 50 includes a narrow top 60 adjacent to one of the indentations 52, and sides 62 which flare outwardly from the narrow top 60 and toward an opposite, bottom face 64 of the board 51. For example, the inventor has found that a frusto-conical protrusion 46 having an end diameter 65 of one-eighth of an inch (about 2.8 mm) will result in an indentation of equal width, but a compression zone 50 having a diameter of about one-quarter of an inch (about 5.6 mm) at the opposite face 64 of the board 51 having a thickness of one-eighth of an inch (about 2.8 mm).

By selectively spacing the indentations 52, an overlap region 66 can be created between each adjacent pair of compression zones 50. Therefore, regions near the bottom face 64 of the board 51 are provided with substantially uniform density, even though the density of the board 51 proximate the top face 68 is lower and less uniform than the density of the board 51 proximate the bottom face 64. Moreover, due to the existence of the protrusions 54, the overall thickness 70 of the board 51 is greater than a prior art board having a comparable bottom face density.

In operation, FIGS. 1 and 2 show a typical sequence of steps resulting in the formation of the board 51. Starting with FIG. 1, it will be noted that the mat 22 is provided on the first die 23, with the second die 25 being spaced away due to the cylinder 28 being retracted. The mat 22 is typically provided in a semi-solid state after initial passage through, for example, pre-press rollers (not shown). The semi-solid mat 22 is then conveyed into position between the first and the second die 23, 25.

When the cylinder 28 extends, the second platen 26 moves toward the mat 22 until the forms 46 of the second die 25 engage the mat 22, and compress the mat 22 against the first die 23. The compression zones 50 form proximate each form 46 and flare outwardly across the mat 22 toward the bottom face 64. The cylinder 28, second platen 26, and second die 25 are then retracted away from the first die 23 and first platen 24, and the consolidated board 51 is removed. The relief angle of the sides 47 of the forms 46 facilitate withdrawal of the second die 25 from the board 51.

Figure 5:
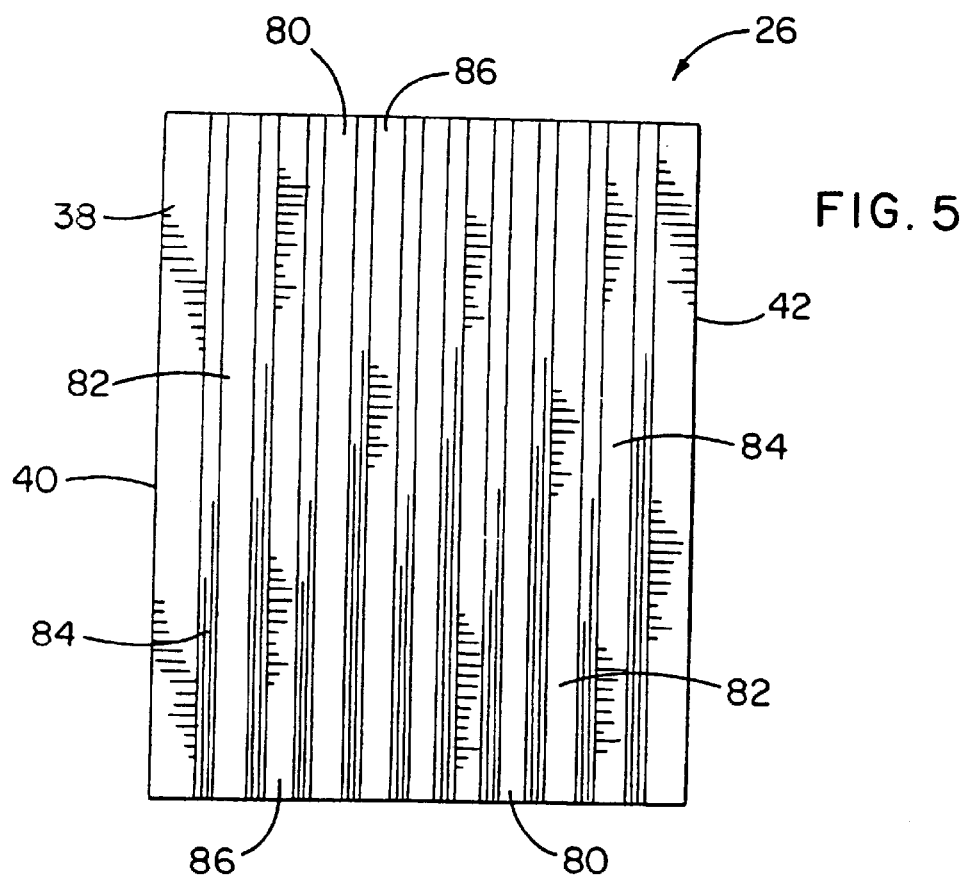
FIG. 5 is a plan view of an alternative die constructed in accordance with the teachings of the invention, having a plurality of linear ribs extending therefrom.

An alternative embodiment of the shape of the second die 25 is depicted in FIG. 5. As shown therein, the second die 25 includes a plurality of elongate linear ribs 80. Each rib 80 includes a bottom edge 82 with angled sides 84. Similar to the first embodiment, the angled sides 84 are provided at relief angles facilitating removal after compression. The ribs 80 are sized and spaced by voids 86 to create the overlapping compression zones 50.

Figure 6:
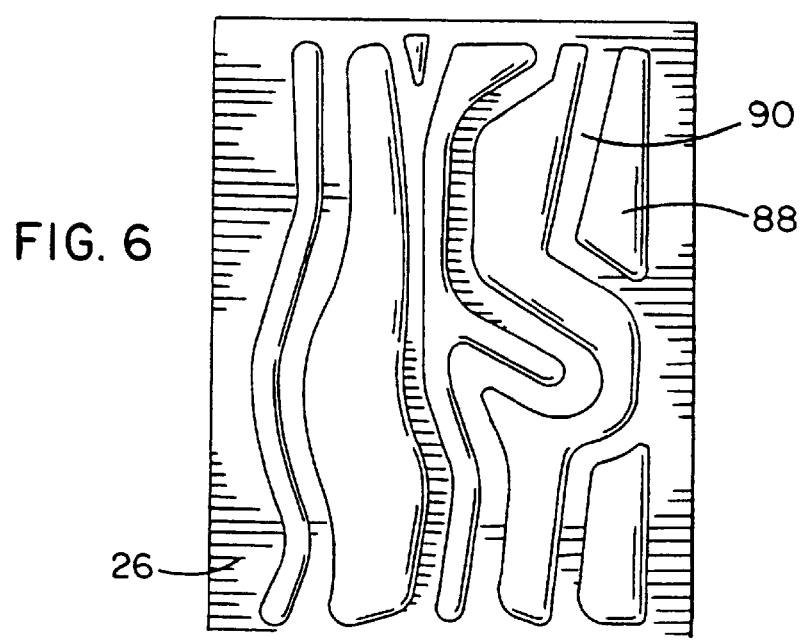
FIG. 6 is a plan view of another alternative die constructed in accordance with the teachings of the invention.

In a further embodiment depicted in FIG. 6, the second die 25 includes a plurality of free-form or amorphous members 88. The members 88 are preferably spaced by voids 90 of substantially uniform width to ensure proper overlapping of the compression zones 50. The members 88 are depicted as curvilinear in certain areas, linear in certain areas, and are randomly arranged. One of ordinary skill in the art will recognize a variety of other shapes are possible, but with each embodiment the members would be spaced by gaps or voids of substantially uniform width to ensure the compression zones overlap.

From the foregoing, it can therefore be appreciated that an improved consolidated cellulosic article, and method and apparatus for manufacturing same, are provided.

What is claimed is:

1. A method of producing a consolidated cellulosic article, comprising the steps of:

providing a first die;

providing a second die opposed to the first die, the second die having a plurality of spaced forms extending toward the first die;

positioning a mat of cellulosic material and a binder agent between the first and second dies, the mat having a first face adjacent the first die and a second face adjacent the second die; and compressing the mat between the first and second dies to form a plurality of compression zones flaring outwardly to the first face, the first face being compressed to a substantially uniform density, the second face being compressed to a density lower than the density of the first face, the compression zones at the first face being overlapped.

2. The method of claim 1 wherein the forms of the second die produce a corresponding plurality of voids in the second face of the mat, the voids being separated by a plurality of protrusions, each void having a base, a compression zone extending between each base and the first face of the mat, each compression zone having a higher density than each protrusion.

3. The method of claim 2 further including the step of selectively positioning the forms so as to produce overlapped compression zones.

4. The method of claim 1 wherein each of the forms is frusto-conical in shape.

5. The method of claim 1 where each of the forms is in the form of an elongated linear rib.

6. The method of claim 1 where each of the forms is in the form of free-form shape.

7. The method of claim 1 wherein the first die is mounted to a first platen and the second die is mounted to a second platen, at least one of the platens being movable by a pressurized cylinder.

8. The method of claim 1 further including the step of heating the mat during the compressing step.

* * * * *